(12) United States Patent
Rieg et al.

(10) Patent No.: US 6,464,064 B1
(45) Date of Patent: Oct. 15, 2002

(54) DEVICE FOR TRANSPORTING GOODS FROM ONE CONVEYOR DEVICE TO AT LEAST ONE OTHER CONVEYOR DEVICE

(76) Inventors: Wolfgang Rieg, Ernst-Heinkel-Strasse 47, D-71404 Korb (DE); Claus Lang, Hofaeckerstrasse 19, D-73660 Urbach (DE)

( * ) Notice: Subject to any disclaimer, the term of this patent is extended or adjusted under 35 U.S.C. 154(b) by 0 days.

(21) Appl. No.: 09/806,732

(22) PCT Filed: Jul. 29, 2000

(86) PCT No.: PCT/DE00/02513

§ 371 (c)(1),
(2), (4) Date: May 21, 2001

(87) PCT Pub. No.: WO01/10755

PCT Pub. Date: Jul. 29, 2000

(30) Foreign Application Priority Data

Aug. 6, 1999 (DE) .......................... 199 37 143
Jul. 29, 2000 (DE) .......................... 100 37 054

(51) Int. Cl.[7] .............................. B65G 47/10
(52) U.S. Cl. .............................. 198/370.09; 198/370.01
(58) Field of Search ................ 198/370.01, 370.03, 198/370.07, 468.6

(56) References Cited

U.S. PATENT DOCUMENTS

| | | |
|---|---|---|
| 1,671,534 A | 5/1928 | Lockhart |
| 1,931,628 A | 10/1933 | Von Reis |
| 4,010,843 A | 3/1977 | Lucas |
| 4,715,766 A * | 12/1987 | Gebhardt ............ 198/468.6 X |
| 4,962,841 A | 10/1990 | Kloosterhouse |
| 5,220,995 A | 6/1993 | Francioni ............ 198/457.1 |
| 5,238,100 A | 8/1993 | Rose, Jr. ............ 198/468.6 |
| 5,291,986 A * | 3/1994 | Wheaton ............ 198/468.6 |
| 5,609,236 A * | 3/1997 | Neukam ............ 198/370.1 |
| 6,158,566 A * | 12/2000 | Pollock ............ 198/468.6 X |

FOREIGN PATENT DOCUMENTS

| | | |
|---|---|---|
| DE | 35 39 723 A | 5/1987 |
| DE | 89 03 730 | 7/1989 |

* cited by examiner

*Primary Examiner*—James R. Bidwell
(74) *Attorney, Agent, or Firm*—Michael J. Striker (57) ABSTRACT

An apparatus for transferring products of different size, weight, shape and load state from one conveyor device to a further conveyor device disposed parallel or at a defined angle to the first conveyor device includes feed rollers (2) that have their own drive and a lifting device (5, 106, 206) for raising and lowering the conveyed product via receiving elements (7), which are located in the space between the feed rollers (2). The lifting device (5, 106, 206) is secured either to or laterally on a longitudinal drive (10, 102) or to a driving carriage (202). Upon the transfer of the conveyed product, the operator of the conveyor devices upstream, downstream, and in between can continue without interruption.

20 Claims, 6 Drawing Sheets

DEVICE FOR TRANSPORTING GOODS FROM ONE CONVEYOR DEVICE TO AT LEAST ONE OTHER CONVEYOR DEVICE

The invention relates to an apparatus for transferring products being conveyed, as generically defined by the preambles to claims 1, 2, 3 and 4.

In the prior art, the most various kinds of apparatus for delivering a product being conveyed from one conveyor device to another are known, such as chain ejectors, belt transfer means, flat belt transfer means, swiveling shunts, discharge pushers, etc. German Utility Model DE 89 03 730 U1 describes an apparatus with which products are grasped by a gripper device and then transferred. Apparatuses of this kind are in use in the beverage industry, for example, for packing bottles in certain packs. U.S. Pat. No. 5,220,995 describes an infeed device for proportioning certain goods to be conveyed, where the goods being conveyed are fed in onto a main feed path and aligned relative to conveyors moving relative to the goods, such as belt or strap conveyors. U.S. Pat. No. 4,962,841 describes an apparatus for transferring goods or products to be conveyed from one feed path to another, which for example is at an angle of 90 to the original feed path. The transfer apparatus and the load-being rollers are driven by means of a centrally driven vertical shaft and round transmission belts. In these apparatuses, there is the problem of motion of a conveyor means (flat belt, round belt) relative to the products being conveyed, so that torsion of the goods being conveyed, which is hard to control, can occur. The product being conveyed cannot be positioned in a defined way during the course of delivery. This often causes disruptions in the flow of material in conveyor devices. In these apparatuses, it is also quite difficult to move different kinds of products being conveyed, that is, products that differ in size, weight, shape (cardboard boxes, containers, etc.), or to conduct a mixed operation in which products of different dimensions need to be conveyed. Another problem, in apparatuses in current use, is when the product being conveyed, such as a plastic container or a cardboard box, is loaded on one side. In that case, crash situations often arise in the discharge or delivery process. Furthermore, it is usually possible for a product being conveyed to be fed in only one direction, and only from one conveyor device to a maximum of one other conveyor device extending parallel, perpendicular, or diagonally to it.

It is therefore the object of the invention to create an apparatus for transferring products being conveyed of various size (width, length, height), weight, shape and loading condition from one conveyor device to at least one second conveyor device, disposed parallel to the first or at a defined angle to it, and to enable a transfer with the capability of precise positioning, that is, without friction and without slipping of the product being conveyed. The invention is intended to make it possible to enable a transfer of products being conveyed not in merely one direction but selectively in at least two direction from one conveyor device to other conveyor devices, disposed parallel or at a defined angle to the first conveyor device. It is intended that the invention be integratable into conveyor devices of the most various kinds, and in particular it should be possible to use the invention in combination with roller conveyors with a very tight roller spacing, and to retrofit existing systems with the invention. The invention is meant to enable transferring even products being conveyed of high weight, such as Europallets, using the most cost-effective technologies and assuring the greatest possible operating safety and reliability with the least possible wear. It must also be possible to use the apparatus in the food industry or in explosion-proof rooms.

This object is attained according to the invention by means of the characteristics of the bodies of claims 1, 2, 3 and 4. Dependent claims 5–20 recite how the invention is further embodied.

By means of the invention, it is attained that products being conveyed of different size, weight and shape, which are also conveyed on conveyor devices in a mixed mode of operation, can be transferred from one conveyor device to at least one other conveyor device, without any friction or slipping of the products being conveyed occurring during the transfer operation. The invention also enables problem-free transferal of products being conveyed loaded on one side, for example; that is, the loading condition of the product being conveyed does not matter. By means of the invention, precise positioning of the most various kinds of product being conveyed in the transfer process is made possible. The invention enables the use of the transfer apparatus in conjunction with conveyor devices of the most various kinds, in particular in conjunction with roller conveyors with very close roller spacing, and also allows existing conveyor devices, especially in roller conveyors, to be retrofitted with the transfer apparatus. With the apparatus, it is also attained that transfers can be made in at least two different directions, and onto a plurality of further conveyor devices parallel to or at a defined angle to the first conveyor device, and that the location of the product being conveyed can be varies in terms of the feeding direction on the conveyor device. The apparatus moreover makes it possible for all the conveyor devices connected to the apparatus to stay in operation during the transfer process, without affecting the flow of material in the rest of the conveyor system. This is a substantial advantage for the attainable throughput quantities in conveyor systems and contributes substantially to the assessment of the efficiency of conveyor systems. Retrofitting into existing systems made by the most various manufacturers is made possibly by a modular design of the apparatus. Another advantage is that the apparatus can be designed to be compact and low in height. The invention also makes it possible for the highest possible operating safety and reliability to be assured during operation of the apparatus, with the least possible wear, and for the apparatus to be used in the food industry or in explosion-proof rooms.

Exemplary embodiments of the subject of the invention are shown in the drawings.

Figure 1:
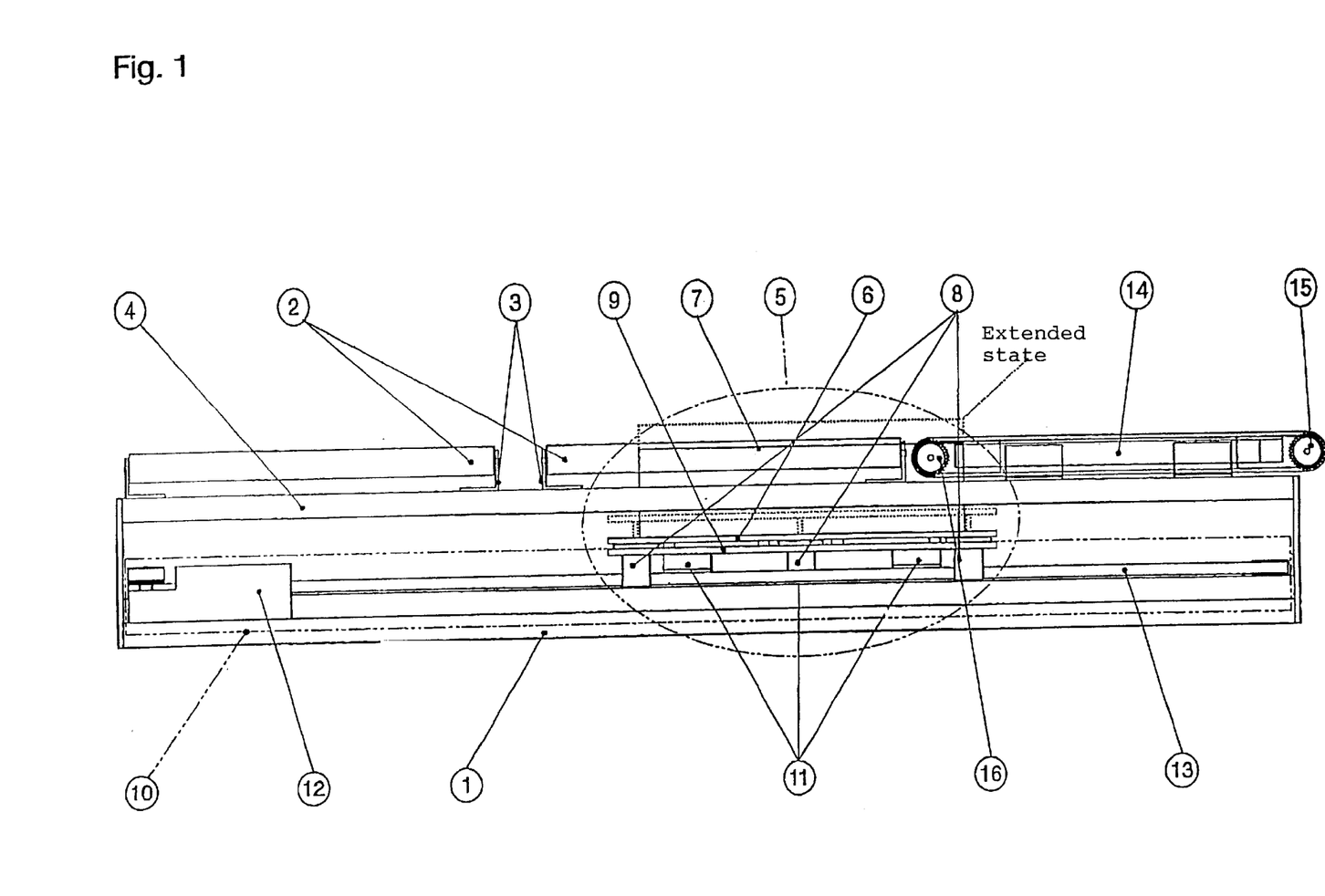
FIG. 1 shows one exemplary embodiment in a front view.

FIG. 1 shows an exemplary embodiment in a view from the front, in which the product being conveyed can be transferred for instance from the main feed path, which is located in the middle, to the feed paths located to the right and left of the main feed path. The feed path located to the left of the main feed path is disposed parallel to the main feed path, and the feed path located to the right of the main feed path transports the product being conveyed at an angle of 90° to the main feed path. The apparatus has a mounting frame (1) and transverse connectors (4), which form the basic frame of the apparatus. The transverse connectors (4) are secured to the mounting frame on the right and left and have a maximum width that is equivalent to the width of the feed rollers (2). The feed rollers (2) are mounted with receptacles (3) on the transverse connectors (4). The feed rollers (2) have their own drive, which is integrated with the feed rollers (2) and which can be designed as an electric motor with an operating voltage of 24V. Because of this independent drive of the feed rollers (2), it is possible to keep the space between the transverse connectors (4) and feed rollers (2) clear over the full width of the apparatus, so that the receiving elements (7) can be moved to the right and left. The feed path to the right of the feed path that allows the product being conveyed to be conveyed elsewhere at an angle of 90° to the main feed path is embodied as a rakelike belt or flat-belt conveyor (14), which is provided with a drive roller (15) with its own electric motor drive, integrated with the drive roller (15), and whose deflection rollers (16) have at maximum the same width as the feed rollers (2), so that the space between the individual belts/flat belts remains clear. The rakelike belt or flat-belt conveyor (14) is designed as a module, which is mounted on the transverse connectors (4). A longitudinal driver (10) connected to the mounting frame (1) is integrated into the apparatus. A lifting device (5) is mounted on the longitudinal driver 10 and is moved to the right and left by the longitudinal driver (10). The longitudinal driver (10) comprises a linear guide (11), which extends over the full width of the apparatus; a drive belt (13), which is connected solidly to the linear guide (11) at one point; and a drive motor (12), which to save space drives the drive belt (13) via a transmission belt onto a deflection roller. The lifting device (5) is solidly connected to the linear guide (11) via the base plate (9). The pneumatic cylinders (8) are secured in the base plate (9). In the arrangement shown, the three pneumatic cylinders (8) form a three-point support for the receiving plate (6), which can be extended upward and on which the receiving elements (7) are secured. The dashed line of the receiving elements (7)/receiving plate (6) represents the extended state of the lifting device (5). The operation of transferring a product being conveyed proceeds as follows: the product being conveyed is moved in place on the main feed path by the self-driven feed rollers (2). The linear guide (11) has moved the lifting device (5) to underneath the product being conveyed, and the receiving elements (7) are in the retracted state. The lifting device (5) now lifts the receiving elements (7) by means of the pneumatic cylinders (8), so that the product being conveyed is lifted away from the main feed path. The drive motor (12), via the drive belt (13), now drives the linear guide (11), so that the lifting device (5) can be moved together with the product being conveyed arbitrarily to the right or left, without causing the product being conveyed to slip. Once the transfer has been accomplished, the lifting device (5) sets the product being conveyed down at the desired position, and the product can be conveyed onward.

Figure 2:
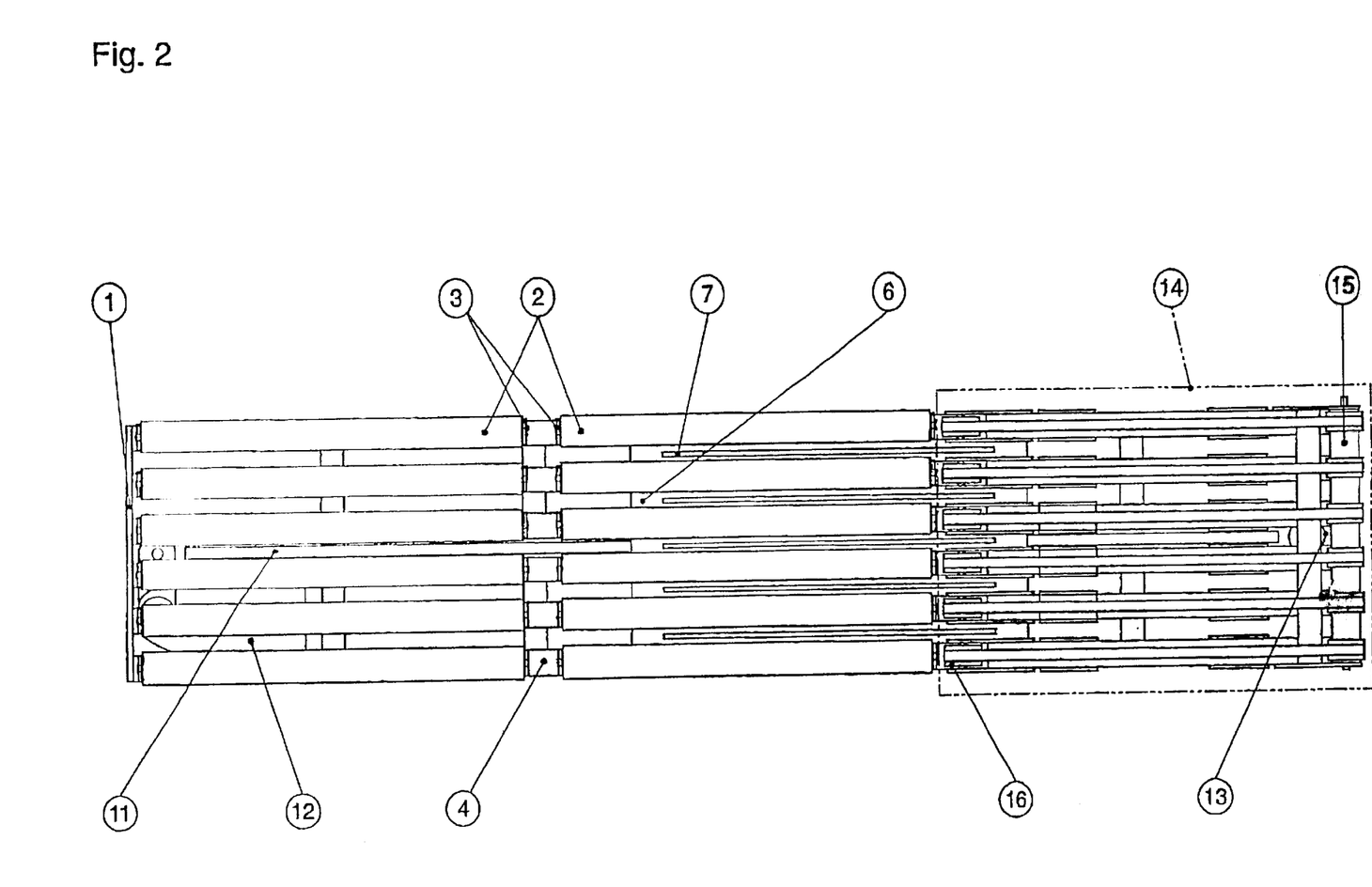
FIG. 2 shows the exemplary embodiment of FIG. 1 in plan view.

FIG. 2 shows the exemplary embodiment of FIG. 1 in plan view. In this view, the space between the feed rollers (2), which are mounted on the transverse connectors (4), and the rakelike belt or flat-belt conveyor (14), also mounted on the transverse connectors (4), can be seen. The receiving elements (7), which are mounted on the receiving plate (6), lift the product being conveyed away from the feed path.

Figure 3:
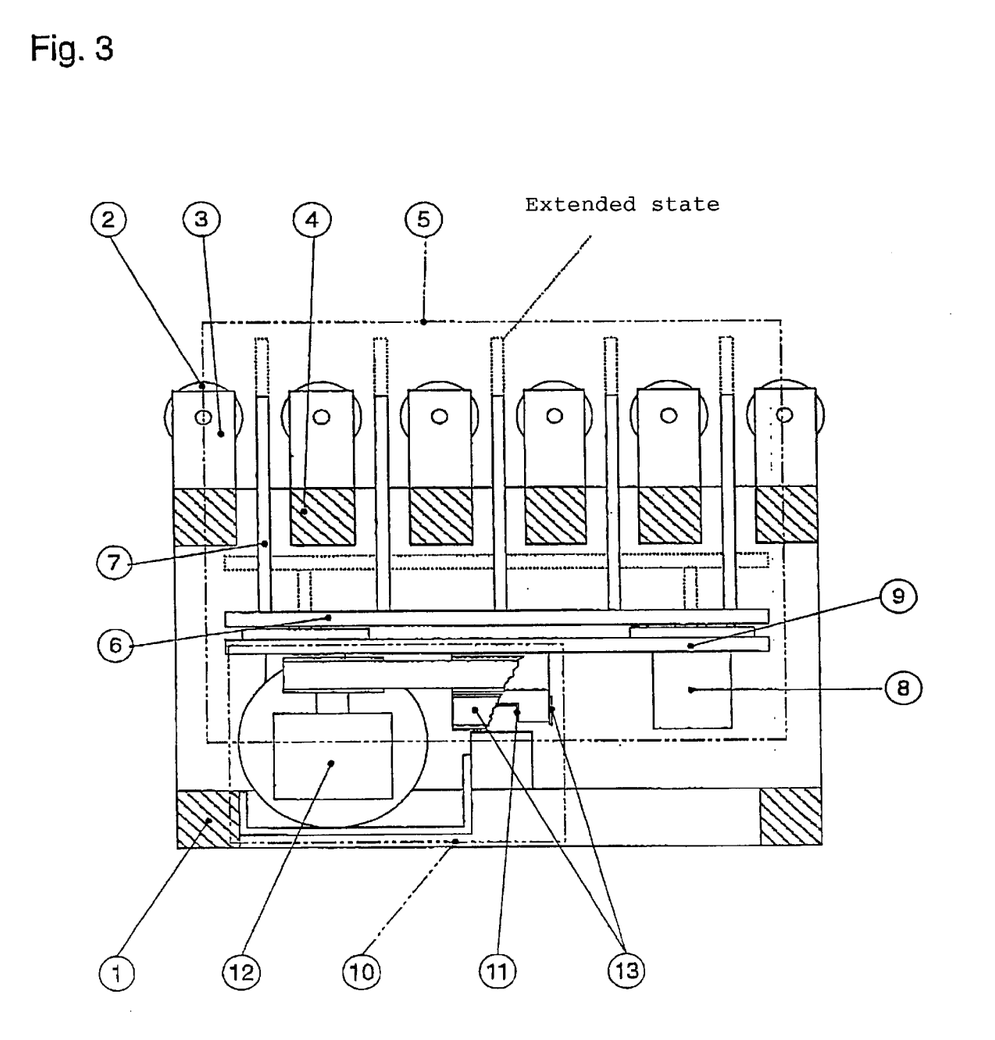
FIG. 3 shows the exemplary embodiment of FIGS. 1 and 2 in a side view.
Figure 4:
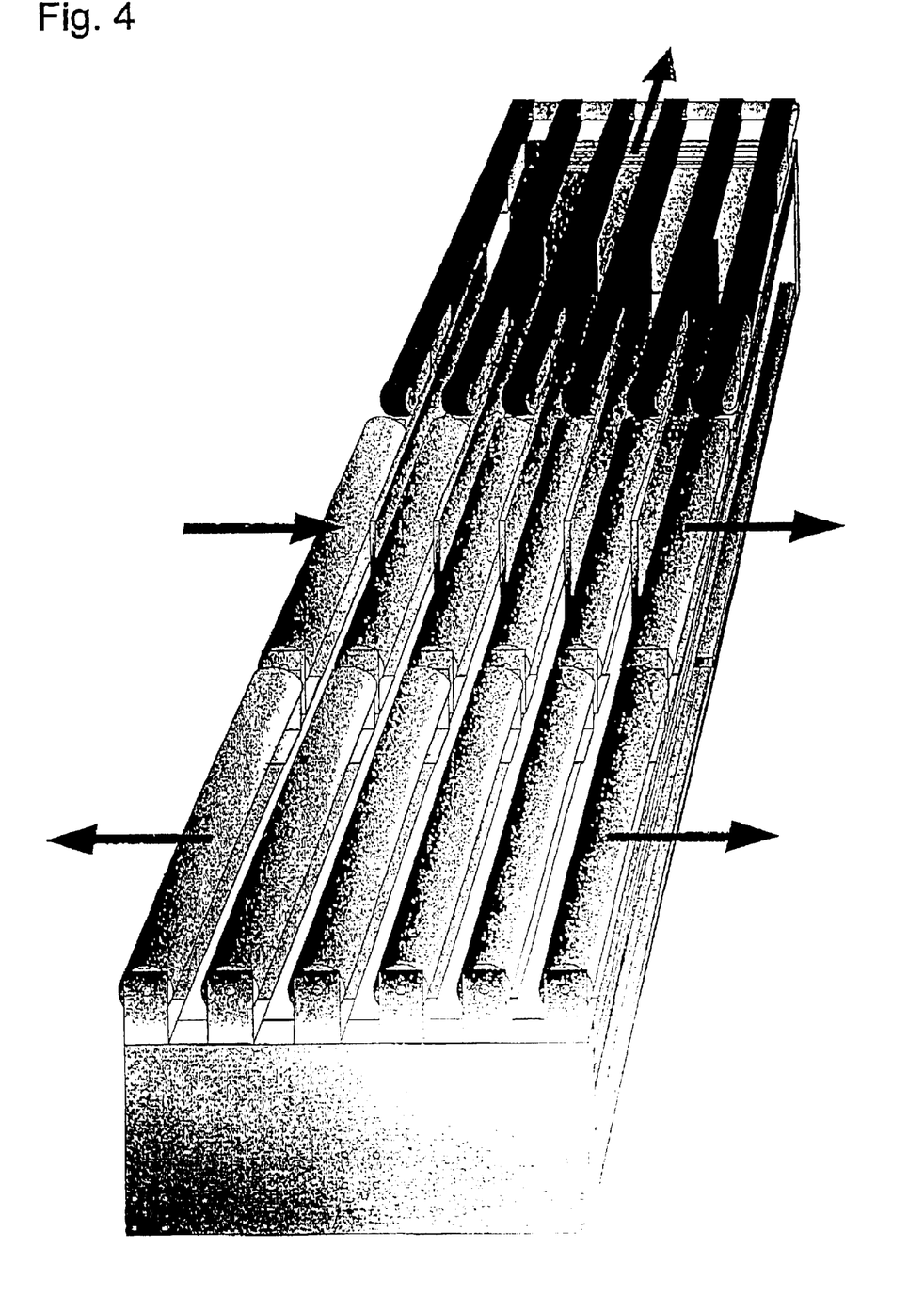
FIG. 4 is a three-dimensional view of the exemplary embodiment of FIG. 1.

FIG. 3 shows the exemplary embodiment of FIG. 1 in a side view from the right, the section taking its course directly to the right of the side part that belongs to the mounting frame (1). In this view, the central disposition of the linear guide (11) is readily seen. The drive belt (13) is solidly connected to the linear guide (11).

Figure 5:
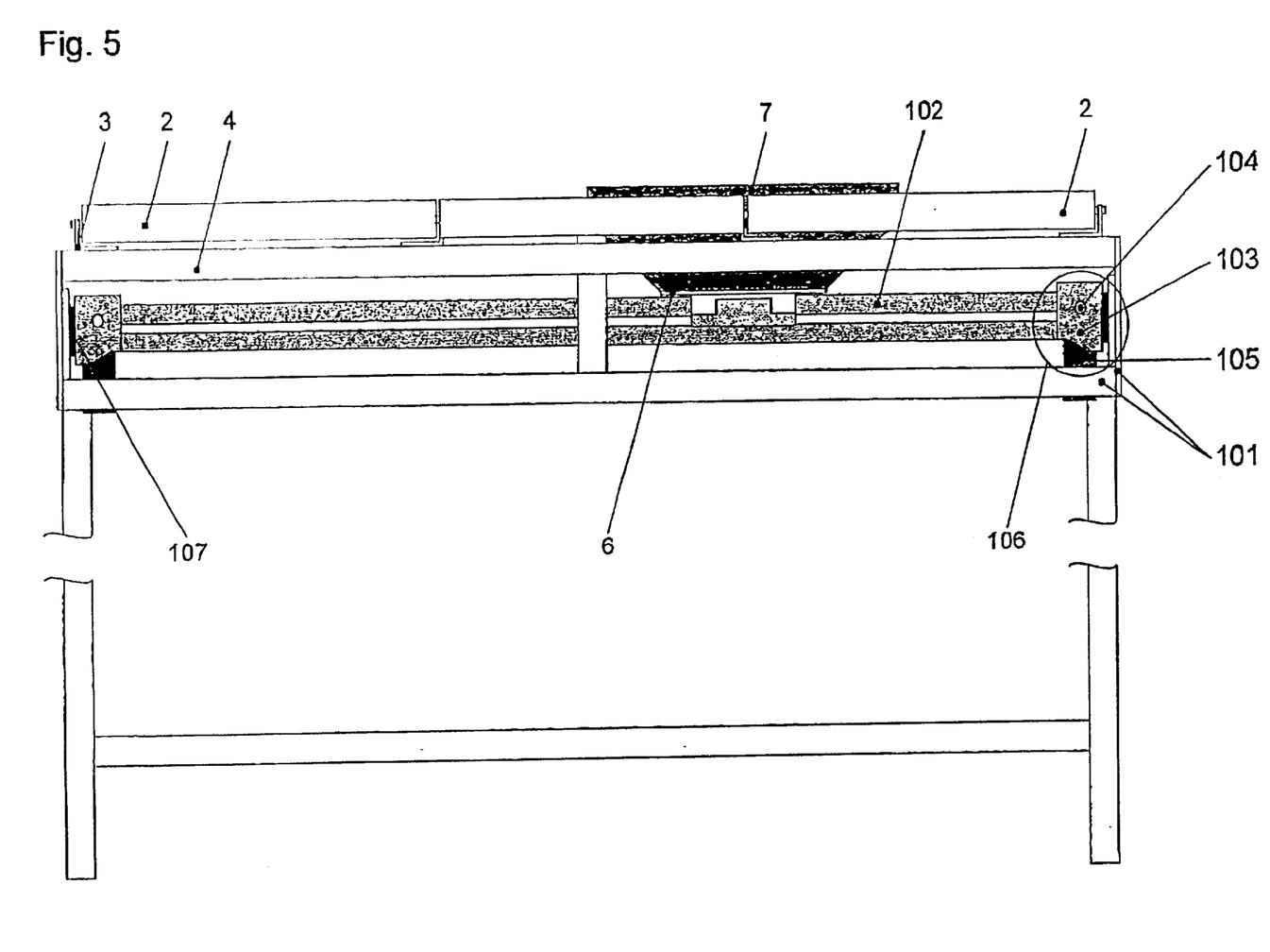
FIG. 5 shows an exemplary embodiment in a front view.

FIG. 5 shows an exemplary embodiment, in a view from the front, in which the product being conveyed can be transferred from the feed path on the right, for instance, onto the feed path on the left. The apparatus has a base frame (101), in which the technical components of the apparatus are integrated and thus form a genuine module. The transverse connectors (4) are secured to the base frame (101) and are integrated with It. They have a maximum width that is equivalent to the width of the feed rollers (2). The feed rollers (2) are mounted with receptacles (3) on the transverse connectors (4). The feed rollers (2) have their own independent drive, integrated with the feed rollers (2), that is designed as an electric motor with an operating voltage of 24 V. In this special exemplary embodiment, the feed rollers (2) can also be driven via a laterally disposed drive that acts on the feed rollers via V-belts or the like. By this independent drive of the feed rollers (2), it is possible to keep the space between the transverse connectors (4)/feed rollers (2) clear over the entire width of the apparatus, so that the receiving elements (7) are mounted on a receiving plate (6) that is secured in turn to a longitudinal driver (102). The longitudinal driver (102) is solidly connected on both ends to bearing receptacles (103). A shaft (104) is supported in the bearing receptacles (103). This shaft (104) is solidly connected to a pneumatic cylinder (105). The pneumatic cylinder is in turn solidly connected to the base frame (101). Also secured to the bearing receptacle (103) is a vertical guide (107), which comprises a guide shoe, secured to the inside of the side plate of the base frame (101), and a guide block, secured to the outside of the bearing receptacle (103). As a precaution against tilting In the even of an uneven vertical motion in the vertical direction, the guide block is ground radially on its outside. The longitudinal driver (102) for Instance comprises a linear guide with its own pneumatic drive, but it can equally well be driven by a 24 V or 400 V electric motor. The operation of transferring a product being conveyed proceeds as follows: The product being conveyed is moved in place on the feed path by the self-driven feed rollers (2). The longitudinal driver (102) has moved the receiving plate (6) together with the receiving elements (7) to underneath the product being conveyed, and the receiving elements (7) in the retracted state are located below the level of the upper edge of the rollers. The lifting devices (106), which are secured to the ends of the longitudinal driver (102), now lift the entire unit, comprising the longitudinal driver (102), the receiving plate (6), and the receiving elements (7), by means of the pneumatic cylinders (105) in such a way that the product being conveyed is lifted from the feed path. The pneumatic cylinder integrated with the longitudinal driver (102) feeds the product being conveyed arbitrarily from right to left. Once the transfer has been accomplished, the lifting devices (106) set the product being conveyed down at the desired position, and the product can be conveyed onward. A variant of the exemplary embodiment described provides that the longitudinal driver (102) is designed such that the longitudinal drive is integrated electrically, pneumatically or in some other way entirely into the profile of the longitudinal driver (102), and that the drive for the vertical motion is integrated electrically, pneumatically or in some other way entirely into the bearing receptacles (3), and the lifting operation is effected by means of levers, which are located outside the encapsulated unit comprising the longitudinal driver (102) and the bearing receptacles (103) braced or supported on the base frame (101), and this makes use of the invention in the food industry and in explosion-proof rooms possible.

Figure 6:
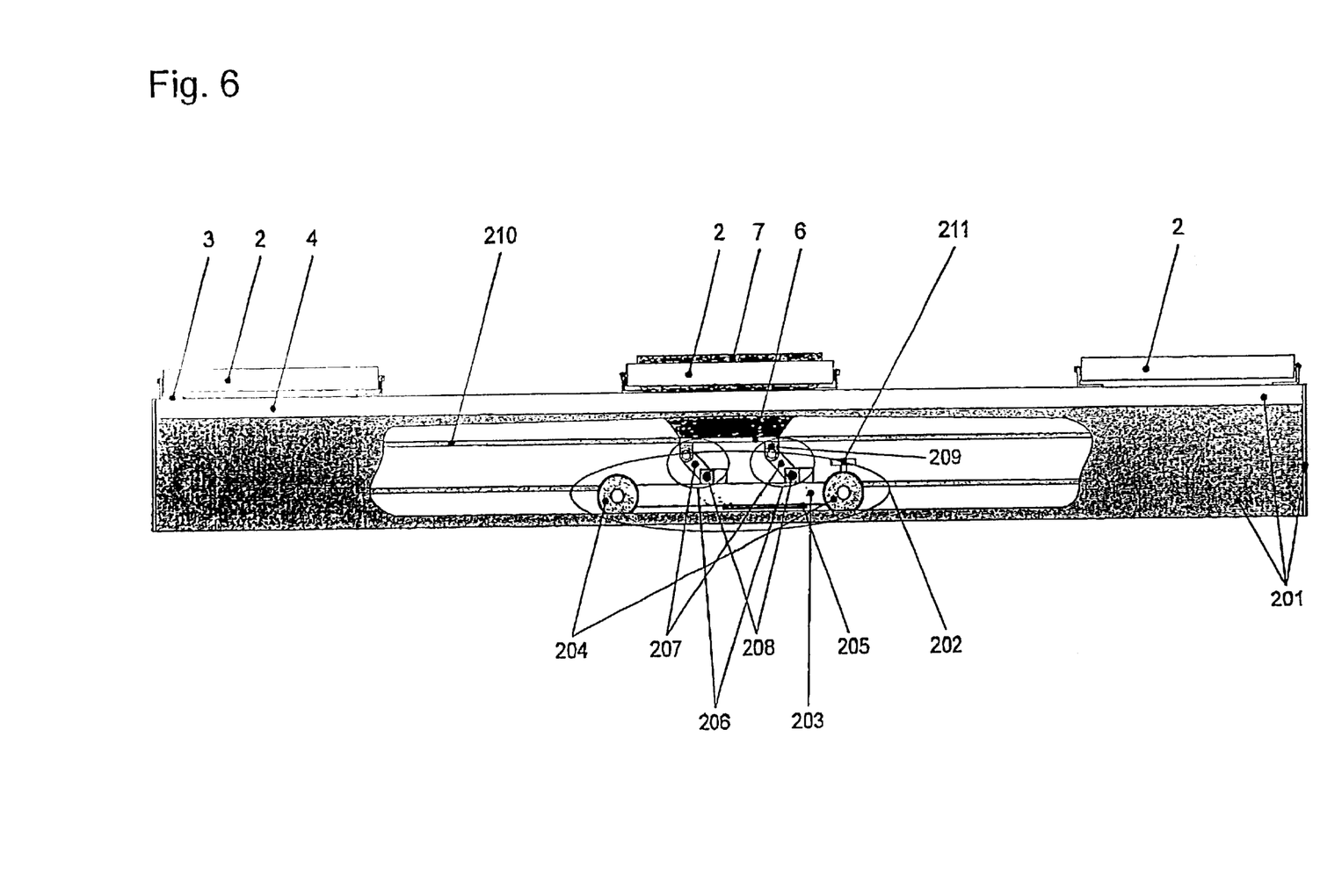
FIG. 6 shows a further exemplary embodiment in a front view.

FIG. 6 shows an exemplary embodiment in a view from the front in which the product being conveyed can be transferred from the feed path located on the right, for Instance, to the feed path located in the middle or to the feed path located on the left. The apparatus has a frame stand (201), with which the technical components of the apparatus are integrated and thus form a genuine module. The transverse connectors (4) are secured to the frame stand (201) on the right and left and are integrated with it. They have a maximum width that is equivalent to the width of the feed rollers (2). The feed rollers (2) are mounted with receptacles (3) on the transverse connectors (4). The feed rollers (2) have their own independent drive, which is integrated with the feed rollers (2) and is designed as an electric motor with an operating voltage of 24 V. Because of this independent drive of the feed rollers (2), It is possible to keep the space between the transverse connectors (4)/feed rollers (2) clear over the full width of the apparatus, so that the receiving elements (7) can be moved to the right and left. The receiving elements (7) are secured to a receiving plate (6), which in turn is connected via lifting devices (206) to the driving carriage (202). The lifting devices (206) comprise levers (207) and shafts (208); the shafts (208) are supported rotatably on the driving carriage (202). The drive required to operate the lifting devices (206), such as a pneumatic cylinder (205) or an electric motor, are Integrated with the driving carriage (202). The pneumatic cylinder is rotatably supported, on its free end, on the driving carriage (202). Via a thrust rod, the pneumatic cylinder (205) acts on the levers (207) of the lifting devices (206), which transmit the force to the ball head joints (209) secured to the receiving plate (6) and thus raise or lower the receiving plate (6) and the receiving elements (7) The driving carriage (202) comprises an undercarriage (203), for example with four wheels (204). The wheels (204) move in the lateral running faces that are integrated with the frame stand (201). For accurate guidance of the driving carriage (202), guide rollers (211) for lateral guidance are secured adjustably to the driving carriage (202). A motor, mounted on the inside in the region of the side plates of the frame stand (201), drives the driving carriage (202) via a drive belt (210) that is partially joined solidly to the driving station that is mounted on the side of the side plates of the frame stand (201). The requisite electrical or pneumatic lines of operating the lifting devices (206) are laid out using a drag conduit.

The operation of transferring a product being conveyed proceeds as follows: The product being conveyed is moved in place on the feed path by the self-driven feed rollers (2). The driving carriage (202) has moved the receiving plate (6) together with the receiving elements (7) to beneath the product being conveyed, and the receiving elements (7) in the retracted state are located at a level below the upper edge of the rollers. The lifting devices now raise the receiving plate (6) with the receiving elements (7) by means of the pneumatic cylinder (205) and the lifting device (206) in such a way that the product being conveyed is lifted away from the feed path. The drive motor, via the drive belt (210), now moves the driving carriage (202) arbitrarily, for instance from the right to the middle or to the left. After the transfer has been accomplished, the lifting devices (206) set the product being conveyed down at the desired position and the product being conveyed can be conveyed onward. The course of motion is controlled via a sequence controller, integrated with the module, so that the positions can be approached with maximum accuracy.

LIST OF REFERENCE NUMERALS

1 Mounting frame
2 Feed roller
3 Receptacle
4 Transverse connector
5 Lifting device
6 Receiving plate
7 Receiving element
8 Pneumatic cylinder
9 Base plate
10 Longitudinal driver
11 Linear guide
12 Drive motor
13 Drive belt
14 Rakelike belt or flat-belt conveyor
15 Drive roller
16 Deflection roller
101 Base frame
102 Longitudinal driver
103 Bearing receptacle
104 Shaft
105 Pneumatic cylinder
106 Lifting device
107 Vertical guide
201 Frame stand
202 Driving carriage
203 Undercarriage
204 Wheel
205 Pneumatic cylinder
206 Lifting device
207 Lever
208 Shaft
209 Ball head joint
210 Drive belt
211 Guide roller

What is claimed is:

1. An apparatus for transferring products being conveyed from one conveyor device to at least one conveyor device, disposed parallel or at a defined angle to the first conveyor device, characterized in that the product being conveyed is moved, by means of feed rollers that are integrated with the apparatus and are provided with their own drive, to a defined position in the apparatus, the feed rollers being secured in a mounting frame and the feed rollers being secured via receptacles to transverse connectors; and that the transverse connectors extend under the feed rollers from one end of the apparatus to the other end of the apparatus and at maximum have the same width as the feed rollers; and that the transverse connectors in turn are secured on their ends to the mounting frame; and that the apparatus is equipped with a lifting device and has a least one receiving plate mounted on this lifting device, on which plate receiving elements are secured, which are located in the space between the feed rollers; and that the upper ends of these receiving elements, in the basic position, are located below the upper edge of the feed rollers; and that the upper ends of these receiving elements, in the working position, are located above the upper edge of the feed rollers; and that the lifting device itself is secured to a device for longitudinally driving the entire lifting device and this longitudinal driver is in turn secured to the mounting frame; and that transferal can be done at an angle of 90° or at an arbitrary angle greater than 0° and less than 180° to the original feeding direction onto at least one conveyor device disposed parallel or at a defined angle to the original conveyor device; and that the feeding direction of the product being conveyed does not change; and that the operation of conveyor devices upstream, downstream, and in between is not interrupted.

2. An apparatus for transferring products being conveyed from one conveyor device to at least one conveyor device, disposed parallel or at a defined angle to the first conveyor device, characterized in that the product being conveyed is moved, by means of feed rollers that are integrated with the apparatus and are provided with their own drive, to a defined position in the apparatus, the feed rollers being secured in a mounting frame and the feed rollers being secured via receptacles to transfers connectors; and that the transverse connectors extend under the feed rollers from one end of the apparatus to the other end of the apparatus and at maximum have the same width as the feed rollers; and that the transverse connectors in turn are secured on their ends to the mounting frame; and that the apparatus is equipped with a lifting device and has at least one receiving plate mounted on this lifting device, on which plate receiving elements are secured, which are located in the space between the feed rollers; and that the upper ends of these receiving elements, in the basic position, are located below the upper edge of the feed rollers; and that the upper ends of these receiving elements, in the working position, are located above the upper edge of the feed rollers; and that the lifting device itself is secured to a device for longitudinally driving the entire lifting device and this longitudinal driver is in turn secured to the mounting frame; and that transferal can be done at an angle of 90° or at an arbitrary angle greater than 0° and less than 180° to the original feeding direction onto at least one conveyor device disposed to the original conveyor device; and that the feeding direction of the product being conveyed changes: and that the further conveyance of the transferred product being conveyed is effected by means of a rakelike belt or flat-belt conveyor, which is integrated with the apparatus and is secured to the transverse connectors and which has one drive roller equipped with its own drive, a plurality of conveyor belts, and on the inside of the apparatus narrow deflection rollers, which have a maximum width equivalent to the width of the transverse connectors, which conveys the product being conveyed onward from the place where the product being conveyed was transferred to a downstream conveyor device; and that the operation of the conveyor devices upstream and downstream is not interrupted.

3. An apparatus for transferring products being conveyed from one conveyor device to at least one conveyor device, disposed parallel or at a defined angle to the first conveyor device, characterized in that the product being conveyed is moved, by means of feed rollers that are integrated with the apparatus and are provided with their own drive, to a defined position in the apparatus, the feed rollers being secured in a mounting frame and the feed rollers being secured via receptacles to transverse connectors; and that the transverse connectors extend under the feed rollers from one end of the apparatus to the other end of the apparatus and at maximum have the same width as the feed rollers; and that the transverse connectors in turn are secured on their ends to the mounting frame; and that the apparatus has at least one receiving element, which is located in the space between the feed rollers; and that the upper ends of these receiving elements, in the basic position, are located below the upper edge of the feed rollers; and that the upper ends of the receiving elements, in the working position, are located above the upper edge of the feed rollers; and that the receiving elements are mounted on a receiving plate, which in turn is secured to at least one longitudinal driver; and that the entire longitudinal driver is connected to a base frame via at least one lifting device; and that at an angle of 90° or at an arbitrary angle greater than 0° and less than 180° to the original feeding direction transferal can be done to conveyor devices disposed parallel or at a defined angle to the original conveyor device; and that the feeding direction of the product being conveyed does not change; and that the operation of the conveyor device upstream, downstream and in between is not interrupted.

4. An apparatus for transferring products being conveyed from one conveyor device to at least one conveyor device, disposed parallel or at a defined angle to the first conveyor device, characterized in that the product being conveyed is moved, by means of feed rollers that are integrated with the apparatus and are provided with their own drive, to a defined position in the apparatus, the feed rollers being secured in a mounting frame and the feed rollers being secured via receptacles to transverse connectors; and that the transverse connectors extend under the feed rollers from one end of the apparatus to the other end of the apparatus and at maximum have the same width as the feed rollers; and that the transverse connectors in turn are secured on their ends to the mounting frame; and that the apparatus is equipped with at least one lifting device and has at least one receiving plate mounted on this lifting device, on which plate receiving elements are secured, which are located in the space between the feed rollers; and that the upper ends of these receiving elements, in the basic position, are located below the upper edge of the feed rollers; and that the upper ends of these receiving elements, in the working position, are located above the upper edge of the feed rollers; and that the lifting device itself is secured to at least one device for longitudinally driving the entire lifting device and this longitudinal driver is a driving carriage and/or sliding carriage, and the moving or sliding elements of the driving carriage and/or sliding carriage are supported in frame stand; and that the driving carriage and/or the sliding carriage, as well as the receiving elements and the feed rollers, can be embodied in such a way that the apparatus is designed as a curve and the driving carriage and/or sliding carriage is capable of following the curve; and that at an angle of 90° or at an arbitrary angle of greater than 0° and less than 180° to the original feeding direction, transferal can be done to at least one conveyor device disposed parallel to or at a defined angle to the original conveyor device; and that the feeding direction of the product being conveyed does not change; and that the operation of the conveyor devices upstream, downstream and in between is not interrupted.

5. The apparatus of claim 1, wherein the vertical lifting motion of the lifting device is effected by at least one pneumatic cylinder, which is mounted on one end of a base plate and on whose other end at least one receiving plate is mounted.

6. The apparatus of claim 1, wherein the vertical lifting motion of the lifting device is effected by means of a motor-driven linear guide, and the drive motor and at least one guide apparatus for at least one receiving plate, wherein said linear guide comprises a vertical column guide, and wherein a first end of said linear guide is mounted on a base plate, and wherein said at least one receiving plate is mounted on a second end of the linear guide.

7. The apparatus of claim 1, wherein the lifting device has at least one guide apparatus, said at least one guide apparatus comprising a vertical column guide, wherein a first end of said at least one guide apparatus is secured to a base plate and wherein a second end of said at least one guide apparatus comprises a guide bush, wherein said guide bush is secured to the at least one receiving plate.

8. The apparatus of claim 1, wherein a vertical lifting motion of the lifting device is effected by means of at least one lifting magnet, wherein a first end of said at least one lifting magnet is mounted on a base plate, and wherein said at least one receiving plate is mounted on a second end of said at least one lifting magnet.

9. The apparatus of claim 1, wherein a horizontal longitudinal motion of the longitudinal drive is effected by a linear guide with a drive motor and a revolving drive belt, and the linear guide is connected on its ends to the mounting frame and the lifting device is mounted on the linear guide.

10. The apparatus of claim 1, wherein a horizontal longitudinal motion of the longitudinal driver is effected by means of at least one column guide with guide shoes, and the at least one column guide is connected on its ends to the mounting frame and the lifting device is mounted on the guide shoes, and the horizontal longitudinal motion of the lifting device is effected by means of a drive motor accommodated in a space-saving way in the region of the longitudinal driver and has a revolving drive belt or a drive chain, wherein said drive motor is in engagement in a region of the lifting device and can move the lifting device in the horizontal direction to both sides relative to an outset position.

11. The apparatus for claim 1, wherein a horizontal longitudinal motion of the longitudinal driver is effected by means of at least one column guide with guide shoes, and the column guide is connected on its ends to the mounting frame and the lifting device is mounted on the guide shoes, and the horizontal longitudinal motion of the lifting device is effected by a bi-directional pneumatic cylinder accommodated in a space-saving way in a region of the longitudinal driver and is in engagement in a region of the lifting device and can move the lifting device in the horizontal direction to both sides relative to an outset position.

12. The apparatus of claim 1, wherein the receiving elements for the product being conveyed are embodied as plates, said plates disposed in a vertical direction on the at least one receiving plate and linearly receiving a load of the product being conveyed.

13. The apparatus of claim 1, wherein the apparatus is constructed as a modular system, so that there is compatability with other conveyor devices, and wherein said other conveyor devices can be retrofitted.

14. The apparatus of claim 1, wherein the apparatus is made of a material selected from the group consisting of steel and aluminum.

15. The apparatus of claim 1, wherein a vertical lifting motion of the lifting device is effected by means of at least one pneumatic cylinder connected on a first end to base frame and connected solidly on a second end to a shaft disposed at an angle of 90° to the lifting motion, and the shaft is supported at at least one bearing receptacle, wherein said at least one bearing receptacle is solidly connected to the longitudinal driver, and to a vertical guide in an outer region, said vertical guide braced against the base frame, wherein outermost faces of said vertical guide pointing toward side plates of the base frame are ground radially in a vertical direction, such that said outermost faces cannot become caught during the lifting motion.

16. The apparatus of claim 1, wherein drives of the lifting device and the longitudinal driver are integrated with a closed profile that is disposed in a longitudinal direction in the apparatus, so that a tight encapsulation is made possible, and that the drives of the lifting device act on levers, said levers located outside the closed profile and comprising a double-hinged or triple-hinged lever; and wherein said levers are braced on a base frame, so that a unit comprising the drives of the lifting device and the longitudinal driver can be raised and lowered in the closed profile.

17. The apparatus of claim 1, wherein a drive of the lifting device operates pneumatically, electrically, electromagnetically, or hydraulically, and vertical guidance operates by means of a device selected from the group consisting of lever devices, hinged devices, linear guides, or column guides with guide shoes.

18. The apparatus of claim 2, wherein the lifting device is secured on a driving carriage, and the driving carriage is provided with wheels that run in a region of a frame stand in an upright U-profile that is a component of the frame stand; and that guide rollers mounted adjustably on the driving carriage guide the driving carriage longitudinally in a travel direction in the frame stand; and wherein the driving carriage has a drive selected from the group consisting of a pneumatic, electric, electromagnetic or hydraulic drive, said drive mounted in or outside the frame stand; and wherein a force transmission to the driving carriage is effected directly by the drive unit or by a drive belt; and wherein said drive belt is disposed in revolving fashion and is connected solidly, but adjustably, to the driving carnage at a receptacle.

19. The apparatus of claim 1, wherein the receiving elements are shaped on a respective top side such that insertion aids are mounted on left and right edges of linear bearing faces, so that the product being conveyed can be centered or positioned precisely.

20. The apparatus of claim 1, wherein the receiving elements are shaped on a respective top side such that individual segments of linear bearing faces are lowered upon reception of the product being conveyed and the product being conveyed is thereby fixed, whereby a transfer of the product being conveyed at a very high speed is made possible.

* * * * *